(12) United States Patent
Wu et al.

(10) Patent No.: US 10,491,715 B1
(45) Date of Patent: Nov. 26, 2019

(54) IP PACKET TRANSLATION TO PIGGYBACK NETWORKING INFORMATION

(71) Applicant: Architecture Technology Corporation, Eden Prairie, MN (US)

(72) Inventors: John Wu, Eden Prairie, MN (US); Nathan E. Bahr, Eden Prairie, MN (US); Ranga S. Ramanujan, Medina, MN (US)

(*) Notice: Subject to any disclaimer, the term of this patent is extended or adjusted under 35 U.S.C. 154(b) by 0 days.

(21) Appl. No.: 16/249,287

(22) Filed: Jan. 16, 2019

Related U.S. Application Data

(60) Provisional application No. 62/791,366, filed on Jan. 11, 2019.

(51) Int. Cl.
 *H04L 29/06* (2006.01)
 *H04L 29/08* (2006.01)
(52) U.S. Cl.
 CPC .............. *H04L 69/08* (2013.01); *H04L 69/22* (2013.01); *H04L 69/324* (2013.01)
(58) Field of Classification Search
 None
 See application file for complete search history.

(56) References Cited

U.S. PATENT DOCUMENTS

| 6,141,371 | A | 10/2000 | Holmes et al. | |
|---|---|---|---|---|
| 6,535,493 | B1* | 3/2003 | Lee | H04W 8/02 370/329 |
| 6,775,251 | B1 | 8/2004 | Wiedeman et al. | |
| 7,289,460 | B1 | 10/2007 | Thacker et al. | |
| 7,852,855 | B1 | 12/2010 | Gooding et al. | |
| 8,548,377 | B2 | 10/2013 | Dankberg et al. | |
| 9,485,063 | B2 | 11/2016 | Shattil | |
| 9,729,581 | B1 | 8/2017 | Skene et al. | |
| 2006/0251115 | A1* | 11/2006 | Haque | H04B 7/2606 370/466 |
| 2009/0110085 | A1* | 4/2009 | Kennedy | H04B 1/71635 375/257 |
| 2009/0290564 | A1* | 11/2009 | Shin | H04L 12/4633 370/338 |

(Continued)

OTHER PUBLICATIONS

Wu, et al., "ADNS IPv6 Transition Architecture and Analysis" IEEE MILCOM 2014, pp. 1-6, Oct. 2014, USA.

(Continued)

*Primary Examiner* — Jamaal Henson
(74) *Attorney, Agent, or Firm* — Carlson, Caspers, Vandenburgh & Lindquist, P.A.

(57) ABSTRACT

Embodiments for a method of exchanging networking information are provided. The method includes receiving an internet protocol (IP) packet at a first networking device and translating, at the first networking device, the IP packet into a ZOOM packet. The ZOOM packet does not conform to an IP protocol. The ZOOM packet includes a copy of the bits of the data field from the IP packet. The ZOOM packet includes a ZOOM header with a portion of an IP header of the first IP packet with networking information. The method also includes sending the ZOOM packet into a broadcast network. The ZOOM packet is received at a second networking device, and the networking information is extracted from the ZOOM header. The IP packet is then re-created and sent toward a destination of the IP packet.

32 Claims, 13 Drawing Sheets

(56) References Cited

U.S. PATENT DOCUMENTS

| | | |
|---|---|---|
| 2011/0116499 A1 | 5/2011 | Lim et al. |
| 2011/0274108 A1 | 11/2011 | Fan |
| 2012/0082161 A1 | 4/2012 | Leung et al. |
| 2012/0163383 A1* | 6/2012 | Ech-Chergui ....... H04L 12/4633 370/392 |
| 2012/0218936 A1 | 8/2012 | Fleeman et al. |
| 2015/0098472 A1* | 4/2015 | Choi ................... H04W 40/02 370/392 |
| 2017/0302475 A1* | 10/2017 | Chan ....................... H04L 45/00 |

OTHER PUBLICATIONS

U.S. Patent and Trademark Office, "Notice of Allowance", U.S. Appl. No. 16/249,331, dated Apr. 26, 2019 pp. 1-8.

U.S. Patent and Trademark Office, "Notice of Allowance", U.S. Appl. No. 16/249,341, dated Apr. 26, 2019, pp. 1-9.

* cited by examiner

| Offsets | Octet | | 0 | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version | | | | IHL | | | | DSCP | | | | | | ECN | | Total Length | | | | | | | | | | | | | | | |
| 4 | 32 | Identification | | | | | | | | | | | | | | | | R | DF | MF | Fragment Offset | | | | | | | | | | | | |
| 8 | 64 | Time to Live | | | | | | | | Protocol | | | | | | | | Header Checksum | | | | | | | | | | | | | | |
| 12 | 96 | Source IP Address | | | | | | | | | | | | | | | | | | | | | | | | | | | | | | | |
| 16 | 128 | Destination IP Address | | | | | | | | | | | | | | | | | | | | | | | | | | | | | | | |

R = Reserved   DF = Don't Fragment   MF = More Fragments

FIG. 3A

| Offsets | Octet | Octet 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Security Parameters Index (SPI) * | | | | | | | | | | | | | | | | | | | | | | | | | | | | | | | |
| 4 | 32 | Sequence Number | | | | | | | | | | | | | | | | | | | | | | | | | | | | | | | |
| 8 | 64 | Payload Data | | | | | | | | | | | | | | | | | | | | | | | | | | | | | | | |
| ... | ... | | | | | | | | | | | | | | | | | | | | | | | | | | | | | | | | |
| ... | ... | Padding (0-255 octets) | | | | | | | | | | | | | | | | | | | | | | | | | | | | | | | |
| ... | ... | | | | | | | | | | | | | | | | | | | | | | | Pad Length | | | | | | | | Next Header | |
| ... | ... | Integrity Check Value (ICV) | | | | | | | | | | | | | | | | | | | | | | | | | | | | | | | |

FIG. 3B

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Z | ZOOM Flags | | | | DSCP | | | | | | ECN | | | | | | | | | | | | | | | | | | | |
| 4 | 32 | Checksum | | | | | | | | | | | | | | | | | | | | | | | | | | | | | | |
| 8 | 64 | Variable | | | | | | | | | | | | | | | | | | | | | | | | | | | | | | |
| 12 | 96 | | | | | | | | | | | | | | | | | | | | | | | | | | | | | | | |
| 16 | 128 | | | | | | | | | | | | | | | | | | | | | | | | | | | | | | | |

Z = ZOOM Embedded(1)

IP PACKET TRANSLATION TO PIGGYBACK NETWORKING INFORMATION

RELATED APPLICATIONS

This application claims the benefit of U.S. Provisional Application No. 62/791,366 filed on Jan. 11, 2019, entitled "IP PACKET TRANSLATION TO PIGGYBACK NETWORKING INFORMATION", which is hereby incorporated herein by reference.

GOVERNMENT CONTRACTS

This invention was made with government support under contract N68335-18-C-0213 awarded by the Navy. The government may have certain rights in the invention.

BACKGROUND

Dynamic routing algorithms rely on the exchange of information amongst routers to identify and update routes to destinations. The number of messages exchanged amongst the routers depends on the routing algorithm being implemented, the number of nodes in the network, and the dynamic nature of the network links among other things.

BRIEF DESCRIPTION

Embodiments for a method of exchanging networking information are provided. The method includes receiving an internet protocol (IP) packet at a first networking device and translating, at the first networking device, the IP packet into a ZOOM packet. The ZOOM packet does not conform to an IP protocol. The ZOOM packet includes a copy of the bits of the data field from the IP packet. The ZOOM packet includes a ZOOM header with a portion of an IP header of the first IP packet with networking information. The method also includes sending the ZOOM packet into a broadcast network. The ZOOM packet is received at a second networking device, and the networking information is extracted from the ZOOM header. The IP packet is then re-created and sent toward a destination of the IP packet.

Embodiments for a program product are also provided. The program product includes a non-transitory processor readable medium having software stored thereon. The software, when executed by one or more processing devices of a first networking device is configured to receive an internet protocol (IP) packet and translate the IP packet into a ZOOM packet. The ZOOM packet does not conform to an IP protocol. The ZOOM packet includes a copy of the bits of the data field from the IP packet. The ZOOM packet includes a ZOOM header with a portion of an IP header of the first IP packet with networking information. The instructions also send the ZOOM packet into a broadcast network and receive a second ZOOM packet. Networking information can be extracted from a ZOOM header of the second ZOOM packet and an IP packet corresponding to the second ZOOM packet can be re-created and sent toward a destination of the IP packet.

Embodiments for a networking device are also provided. Then networking devices includes one or more processing devices and storage media communicatively coupled to the one or more processing devices. The storage media including software stored thereon, the software, when executed by the one or more processing devices, configured to receive an internet protocol (IP) packet and translate the IP packet into a ZOOM packet. The ZOOM packet does not conform to an IP protocol and includes a copy of the bits of the data field from the IP packet. The ZOOM packet includes a ZOOM header with a portion of an IP header of the first IP packet with networking information. The ZOOM packet is sent into a broadcast network. The instructions cause the one or more processing devices to receive a second ZOOM packet and extract networking information from a ZOOM header of the second ZOOM packet. The instructions also cause the one or more processing devices to re-create an IP packet corresponding to the second ZOOM packet and send the re-created IP packet toward a destination of the IP packet.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 3A is an illustration of an IP header of an IPv4 packet;

FIG. 3B is an illustration of an ESP header of IPv4 packet;

FIG. 3C is an illustration of an example header of a ZOOM packet;

DETAILED DESCRIPTION

For networks or links with a low bit-rate, the networking information exchanged by routing algorithms can take up a significant amount of the available bandwidth, blocking out user data that the routing algorithm is intended to benefit. The exchange of networking information can be reduced by operating the network in a static routing state—in which routes are manually set and are not dynamically updated by the routing software. This static routing state relieves the network from having to send as much networking information, but the routers are not able to dynamically update their routing tables to reflect changes to the network. Because of this, static routing operations can cause unnecessary transfer of user data packets, since user packets may be sent in accordance with static routes when the destination on that static route is no longer reachable. This unnecessary transfer of packets can also take up significant bandwidth and block legitimate user data on a low bit-rate network or link, especially when the nodes and/or links in the network change or move frequently. Additionally, if a portion of the network operates to broadcast all packets to all devices, the detrimental effect of sending networking information or superfluous user data is magnified.

Figure 1:
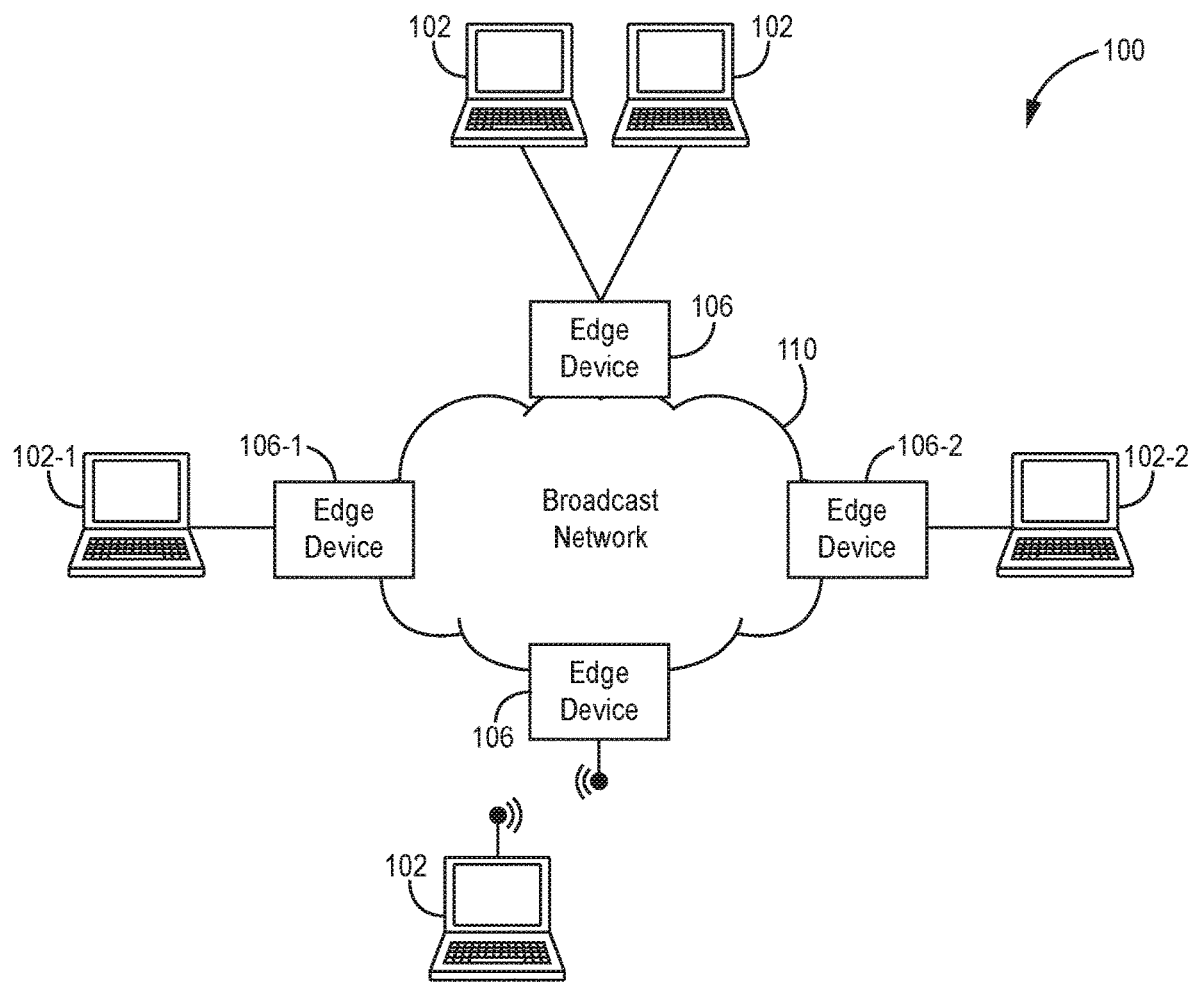
FIG. 1 is a block diagram of an example IP network including a plurality of edge devices exchanging networking information over a broadcast network.

FIG. 1 is a block diagram of an example network 100 implementing a distributed performance enhancing proxy (PEP) for efficiently transferring networking information along with information from Internet Protocol (IP) packets in network 100. Network 100 includes a plurality of endpoint devices 102 communicatively coupled together via a broadcast network 110. Endpoint devices 102 communicate IP packets therebetween via the broadcast network 110. The subnets outside of the broadcast network 110, including the endpoint devices 102 operates in accordance with an IP protocol. In an example, the subnets outside of broadcast network 110 operate in accordance with the IP version 4 (IPv4) protocol. In another example, the subnets outside of broadcast network 110 operate in accordance with the IP version 6 (IPv6) protocol.

In an example, the broadcast network 110 operates in accordance with a non-IP protocol, which is also referred to herein as the "ZOOM protocol". A plurality of edge devices 106 implement distributed PEPS to translate between the IP protocol outside of the broadcast network 110 and the ZOOM protocol of the broadcast network 110 to transfer information from IP packets across the broadcast network 110. For example, a first edge device 106-1 can receive an IP packet from a first endpoint device 102-1, wherein the first IP packet has a second endpoint device 102-2 as a destination. The first edge device 106-1 can transform the IP packet into a packet that conforms to the ZOOM protocol (also referred to herein as a "ZOOM packet"). The first edge device 106-1 can then send the ZOOM packet into the broadcast network 110. A second edge device 106-2 can receive the ZOOM packet and transform the ZOOM packet back into an IP packet. This recreated IP packet can correspond to the (original) IP packet received by the first edge device 106-1 from the first endpoint device 102-1. The recreated IP packet can then be sent from the second edge device 106-2 to the second endpoint device 102-2. Since the re-created IP packet corresponds to the original IP packet sent from the first endpoint device 102-1, the edge devices 106-1 acts to transport the IP packet from the first endpoint device 102-1 across the broadcast network 110 to the second endpoint device 102-2.

The broadcast network 110 (including the edge devices 106) is configured to implement the ZOOM protocol therein to provide increased efficiencies over the IP protocol given the low bit-rate links in the broadcast network 110. In an example, the ZOOM protocol enables networking information to be communicated between the edge devices 106 along with the information for the IP packets in the same number of bits as the IP packets themselves would take. The ZOOM protocol does this by modifying the IP packets to remove information that does not need to be transferred across the broadcast network and to replace the removed information with networking information.

The broadcast network 110 includes a plurality of edge devices 106 that implement the distributed PEPs and control which packets are sent into the broadcast network 110. Each edge device 106 is communicatively disposed between one or more endpoint devices 102 and the broadcast network 110 and acts as a protocol translator between the IP network for those one or more endpoint devices 102 to the broadcast network 110. The plurality of endpoint devices 102 can communicate IP packets therebetween by sending and receiving the IP packets over the broadcast network 110 via their respective edge device 106. The edge devices 106 receive outbound IP packets from the endpoint device(s) 102 therebehind, translate the IP packets into ZOOM packets, and send the ZOOM packets into the broadcast network 110. The edge devices 106 also receive inbound ZOOM packets from the broadcast network 110, translate those ZOOM packets back into IP packets, and send the IP packets to the endpoint device(s) 102 therebehind.

Each of the plurality of endpoint devices 102 can be communicatively coupled to a respective edge device 106 over one or more respective wired and/or wireless network links. Each endpoint device 102 is a device capable of generating and receiving original IP packets for communication with another endpoint device 102 over an IP network. Example endpoint devices 102 include a personal computing device (e.g., a desktop computer, laptop computer, mobile device), IP phone, server, industrial equipment, sensor, encryption device, and a networking device generating or receiving original IP packets. Zero, one, or more than one endpoint device 102 can be behind each edge device 106.

The edge devices 106 are part of the larger broadcast network 110 of devices and are communicatively disposed at the edge of the broadcast network 110. Edge devices 106 are networking devices that control and forward information between the broadcast network 110 and the IP networks outside the broadcast network 110. All ZOOM packets sent into the broadcast network 110 by the edge devices 106 of the broadcast network 110 are received by all other edge devices 106 of the broadcast network 110. Packets sent and received by the edge devices 106 to and from devices "behind" the edge devices 106 (i.e., devices outside of the broadcast network 110 communicatively coupled to the edge devices 106, such as endpoint devices 102) are sent or forwarded along according to the protocol of the particular network or sub-net that is behind that edge device 106 (e.g., a local area network (LAN)).

The edge devices 106 control entry of IP packets into the broadcast network 110 to reduce the number of packets sent therein to destinations that are unreachable. To control entry of IP packets, the edge devices 106 maintain a table of forward destinations. The table of forward destinations is an indication of the destinations that are reachable via the broadcast network 110. In some examples, the table can also include indications of destinations that are known to be not reachable. Based on the table of forward destinations, the edge devices 106 take actions so that IP packets to unreachable forward destinations are discarded (filtered out) prior to entry into the broadcast network 110. The forward destinations can be indicated in the table in any suitable form, such as via a device IP address or a subnet IP address.

To maintain the table of forward destinations, the edge devices 106 exchange networking information with one another over the broadcast network 110. The networking information is control plane information for the edge devices 106. The networking information includes reachability information indicating the reachability of endpoint devices 102 and/or subnets behind the edge devices 106. For example, edge device 106-1 can send out reachability information indicating that endpoint device 102-1 or a subnet thereof is reachable via edge device 106-1. Likewise, edge device 106-2 sends out reachability information indicating that endpoint 102-2 or a subnet thereof is reachable via edge device 106-2.

Other networking information transferred by edge devices 106 can include link monitoring information, link management information, or a data compression technique used (e.g., for IP address or subnets). In some examples, the edge devices 102 can transfer non-networking control information (e.g., control information used by other devices or software modules distinct from the edge device 106 or edge software module). For example, if the edge device 106 is a WAM (discussed below with respect to FIG. 9), the edge device 106 can send WAM control information to other WAM edge devices 106 that the WAM would otherwise send over a dedicated control channel implemented by the WAMs. Transferring the WAM control information via ZOOM packets can be used instead of the dedicated control channel, freeing up the bandwidth of the dedicated control channel for other uses. Alternatively, transferring the WAM control information via ZOOM packets can be used as a back-up e.g., initiated on-demand in response to the dedicated control channel becoming unavailable (e.g., failing or overloaded) for some reason.

The edge devices 106 can communicate the networking information amongst one another in a manner that efficiently utilizes the available bandwidth of the broadcast network 110. In particular, the edge devices 106 can communicate the networking information therebetween by piggybacking the networking information with data from IP packets that is sent across the broadcast network 110. The IP packets can be user IP packets sent between the endpoint devices 102. The edge devices 106 can capture these IP packets from the endpoint device 102 behind that edge device 106 and modify the IP packets to create corresponding ZOOM packets, which include networking information therein along with the data from the IP packets. Advantageously, by utilizing the ZOOM protocol and creating ZOOM packets, the networking information and the data from the IP packets can be sent across the broadcast network 110 in the same number of bits as the original IP packet contained. Thus, the networking information can be communicated across the broadcast network 110 with no increase in the number of bits required as compared to simply forwarding the IP packets across the broadcast network 110.

Figure 2:
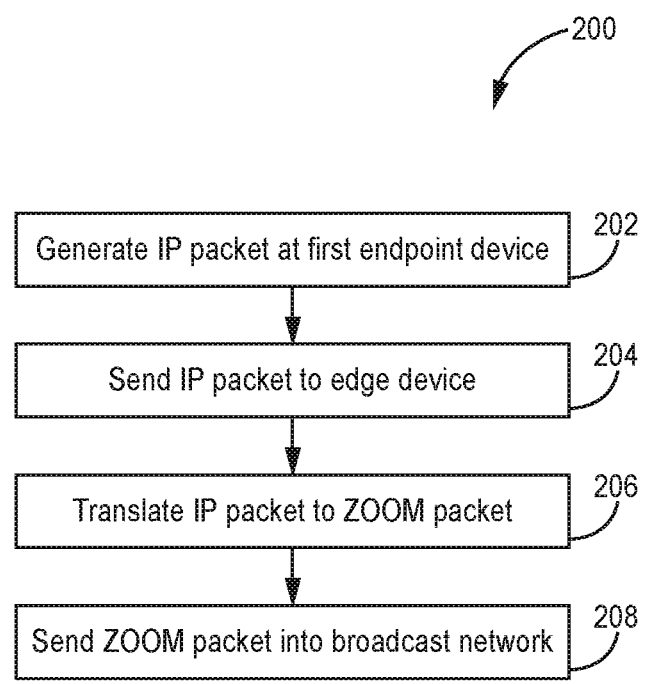
FIG. 2 is a flow diagram of an example method of translating an IP packet into a ZOOM packet.

FIG. 2 is an example method 200 that can be performed by the edge devices 106 to piggyback the networking information with data from an IP packet sent across the broadcast network 110. First endpoint device 102-1 can generate a first IP packet for a destination wherein the first IP packet will be sent to the destination via the broadcast network 110 (block 202). In this example, the destination of the first IP packet is the second endpoint device 102-2. The first endpoint device 102-1 can generate the first IP packet in accordance with the IP standard to which the first endpoint device 102-1 and the second endpoint device 102-2 operate. The first endpoint device 102 can then send the first IP packet to the first edge device 106-1 for traversing the broadcast network 110 (block 204). In some examples, one or more network devices (e.g., a bridge, hub, switch, router) can be disposed between the first endpoint device 102-1 and the first edge device 106-1. In any case, the first edge device 106-1 receives the first IP packet, translates the IP packet into a ZOOM packet (block 206), and sends the ZOOM packet into the broadcast network 110 (block 208). Once the ZOOM packet has been created, the original IP packet can be discarded.

FIG. 3A is an illustration of the mandatory fields of an IP header 300 of an IPv4 packet. FIG. 3B is an illustration of an encapsulating security payload (ESP) header 302 of an IPv4 packet implementing ESP (also referred to herein as an "ESP packet"). FIG. 3C is an illustration of a header of a ZOOM packet.

In an example, a ZOOM packet includes a ZOOM header, followed by a modified ESP header (if from an ESP packet), followed by a data field. The data field of a ZOOM packet includes a copy of the bits from all fields of the corresponding IP packet after the IP header or, in the case of an ESP packet, a copy of the bits from all fields after the ESP header. In an example, a ZOOM packet can be created from either an IP packet that does not implement ESP or an IP packet that does implement ESP. In either case, the ZOOM header has the same number of the bits as the IP header that the ZOOM packet was created off. If the ZOOM packet is created from a packet that does not implement ESP, no modified ESP header is present in the ZOOM packet. If the ZOOM packet is created from a packet that does implement ESP, a modified ESP header is included in the ZOOM packet. The modified ESP header has the same number of bits as a standard ESP header. By having the ZOOM header contain the same number of bits an IP header, the modified ESP header have the same number of bits as a standard ESP header, and the data field of the ZOOM packet be a copy of the bits of all fields from the corresponding IP packet after the IP header (or ESP header if an ESP packet), the ZOOM packet will have the same number of bits as the IP packet from which it was created. Thus, the ZOOM packet can be sent through the broadcast network 110 in the same number of bits as its corresponding IP packet would have used.

To translate an IP packet into a ZOOM packet, an edge device 106 extracts information from the IP header of the IP packet. The information extracted from the IP header depends on characteristics of the IP packet. For example, initial packets in a data flow between endpoint devices 102 can have different information extracted than subsequent (non-initial) packets in a data flow. The information that is extracted from a given IP header is based on whether the information is used for recreation of the IP packet by the edge devices 106. If the information in the IP header is not used for re-creation of the IP packet, the information is not extracted. If the information is used for re-creation of the IP packet, the information is extracted. The extracted information is included in the ZOOM header so that the extracted information is communicated to the edge devices 106 and can be used to recreate the IP packet. The information that is not extracted is discarded.

In an example, the data in the differential services code point (DSCP) and explicit congestion notification (ECN) field are extracted for all IP packets. If the IP packet is a non-initial packet, is not fragmented, and is an ESP packet, no other information is extracted. If the IP packet is not an ESP packet the data in the source IP address field and protocol field is also extracted from the IP header. If the IP packet is an ESP packet but is the initial packet in a data flow, the source IP address is extracted in additional to the data in the DSCP, ECN and header checksum fields. If the IP packet is a fragment, the data in the identification field, the more fragments (MF) flag, and fragment offset field is extracted in addition to the data in the DSCP, ECN and header checksum fields. The first edge device 106 can store information indicative of the active data flows (e.g., values in the SPI and destination IP address fields thereof) for IP packets sent from endpoint devices 102 behind it for use in identifying subsequent (non-initial) packets in those active data flows.

The information that is not extracted can either be re-created by the edge devices 106 or is arbitrary. If the information is not arbitrary and cannot be re-created by the edge devices 106 the information is extracted and included in the ZOOM header for communication to those edge devices 106. In an example, the data in the version field is not extracted because ZOOM only operates on packets of a single IP protocol (e.g., IPv4), so the edge devices 106 recreating the IP packet know that the version field of the re-created IP packet corresponds to that single IP protocol (e.g., a 4 for IPv4). In an example, the edge devices 106 only process IP packets without options, so the data in the internet header length (IHL)) field is known to be 5 and is not extracted. In an example, the total length of the IP packet can be obtained implicitly, so the data in the total length field can be re-created without extracting. In an example, the data in the identification field is non-essential for non-fragmented packets, so the data in the identification field is not extracted. In an example, the reserved flag is always zero, so the data in the reserved flag can be re-created without extracting. In an example, the don't fragment (DF), MF, and fragment offset fields are non-essential for non-fragmented packets, so that data does not need to be extracted. In an example, the time to live value is can be arbitrarily set during re-creation, so the data in that field does not need to be re-created. The protocol field and the source IP address field is the same for all IP packets in a data flow. Thus, the data in these fields can be extracted for the initial packets in a data flow and communicated in the corresponding ZOOM packet to the other edge devices 106. Upon receiving this information in the ZOOM packet, the edge devices 106 can store the data from the source IP address and the protocol field along with an association between the data and the data from the security parameter index (SPI) field and the destination IP address. Then, for subsequent packets in the data flow, the edge device 106 can look-up the source IP address and the protocol data based on the association stored between the SPI data and the destination IP address. Accordingly, for non-initial ESP packets in a data flow, the source IP address and protocol data are not extracted.

Once the appropriate data is extracted, that data is included in the ZOOM header for communication to the other edge devices 106. Bits corresponding to fields with data that is not extracted are available to be used for communication of ZOOM information, which includes the networking information, to the other edge devices 106. Four additional bits are available for ZOOM information in the modified ESP header, because the ESP next header value always corresponds to the single IP protocol (e.g., IPv4) translated, the bits for this field does not need to be communicated to the edge devices 106 and is available for use by ZOOM information.

In an example, data compression of the source IP address and/or destination IP address can also be used to obtain additional bits. For example, if all edge devices 106 for the broadcast network 110 communicate only with a known list of subnets, each edge device 106 can be configured with a table association each subnet in the list of subnets with an index number (e.g., from 1 to 2047). This index number can be represented in a smaller number of bits than the source IP address and destination IP address respectively, and the index number can be included in the ZOOM packet instead of the source IP address or destination IP address. Thus, additional bits can be obtained from the source IP address and destination IP address field. All edge devices 106 are configured with the same association between index number and subnet, so that the index numbers will map the same for each edge device 106. In an example, for an ESP packet that is a non-initial packet of a data flow, up to 121 bits of data can be used for ZOOM information. The other bits of data are used to communicate the extracted DSCP and ECN data as well as to calculate a new checksum for the ZOOM header.

The ZOOM information can be ZOOM overhead data, such as ZOOM flags, information corresponding to fields in the IP header, and the networking information. Any suitable format for the ZOOM header can be used, as long as the edge device 106 to which the networking information is being sent is able to decode the bits to obtain the ZOOM information therefrom. Each edge device 106 of the broadcast network 110 can be configured to follow a common ZOOM protocol so that all edge devices 106 of the broadcast network 110 can decode ZOOM packets from other edge devices 106 of the broadcast network 110 as described herein.

Once the ZOOM packet is created, the ZOOM packet is sent into the broadcast network 110. The first edge device 106 can continue capturing IP packets from endpoint device(s) 102 therebehind and translating them into ZOOM packets. In an example, each IP packet translated, is translated into a single corresponding ZOOM packet.

Given the broadcast nature of the ZOOM packets, the ZOOM packets sent into the broadcast network 110 are forwarded to all edge devices 106 in the broadcast network 110. Thus, the networking information in a ZOOM packet sent into the broadcast network 110 is sent to all the edge devices 106 in the broadcast network 110. In an example, the networking information in at least a portion of the ZOOM packets can be intended to be received by all edge devices 106 in the broadcast network 110. An example of networking information that is intended to be received by all edge devices 106 is reachability information. Each edge device 106 can send reachability information into the broadcast network 110 and each edge device 106 can receive the reachability information from every other edge device 106. The edge devices 106 can maintain/update their table of forward destinations in accordance with the reachability information received from the other edge devices 106. For example, if the first edge device 106-1 sends reachability information indicating that the first endpoint device 102-1 is reachable via the first edge device 106-1 or more generally via the broadcast network 110. The other edge devices 106 upon receiving that reachability information can update or otherwise include an indication in their table of forward destinations that endpoint device 102-1 is reachable via the first edge device 106-1 or more generally that endpoint device 102-1 is reachable via the broadcast network 110. The reachability information can be indicated in the tables of forward destinations in any suitable manner. The reachability information can also be indicated in the ZOOM packets in any suitable manner. In an example, the IP addresses of the reachability destinations/sub-nets are indicated in the ZOOM packets using their index numbers to reduce the number of bits used. In an example, the reachability information includes an indication whether each destination identified in the ZOOM packet is reachable or no longer reachable. In an example, the reachability information includes an indication of how many different broadcast networks 110 must be traversed from the edge device 106 to get there. In an example, the reachability information includes an indication of whether compression (index numbers) are used for the destinations/sub-nets. In an example, the reachability information includes an indication of the prefix size of the destinations/sub-nets. With all edge devices 106 sharing and receiving reachability information in this way, all the edge devices 106 can maintain an up-to-date table of forward destinations via the broadcast network 110.

Figure 4:
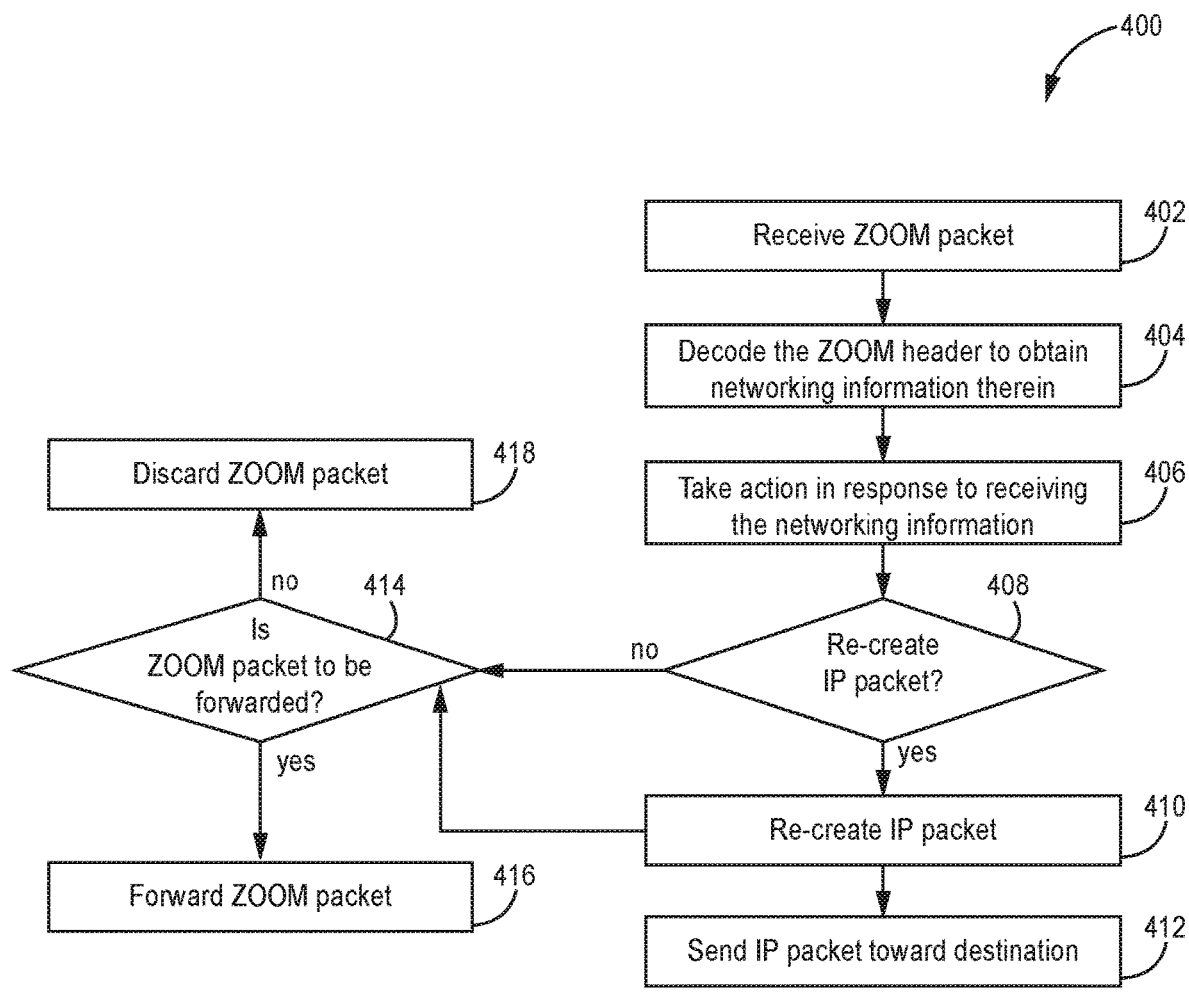
FIG. 4 is a flow diagram of an example method of receiving a ZOOM packet and recreating an IP packet therefrom.

FIG. 4 is a flow diagram of a method 400 that can be performed by an edge device 106 to obtain networking information (e.g., reachability information) from a ZOOM packet. A second edge device 106-2 can receive a ZOOM packet from the broadcast network 110 (block 402). In an example, the second edge device 106-2 can verify that the received packet is a ZOOM packet by checking a ZOOM flag bit in the header. In an example this flag bit is the first bit (bit 0) in the location where the version field of the IP header would be.

Once the second edge device 106-2 verifies that the received IP packet is a ZOOM packet (e.g., identifies that bit 0 of the ZOOM packet is '1'), the second edge device 106-2 can decode the ZOOM packet in accordance with the ZOOM protocol to obtain the networking information therein (block 404). In an example, decoding the ZOOM packet includes reading the bits of the ZOOM header in accordance with the ZOOM protocol. Once the networking information that is in the ZOOM header is decoded, the second edge device 106-2 can take action based on the networking information (406). For example, the second edge device 106-2 can obtain reachability information indicating that the first endpoint device 102-1 is reachable via the first edge device 106-1. The second edge device 106-2 can then update its table of forward destinations to include an indication that the first endpoint device 102-1 is reachable via the first edge device 106-1, or more generally via the broadcast network 110.

Once the networking information has been obtained by the second edge device 106-2 from the ZOOM packet, the second edge device 106-2 can determine whether to re-create the IP packet corresponding to the ZOOM packet (block 408). In an example, the second edge device 106-2 can determine that the IP packet corresponding to the ZOOM packet is to be re-created if a destination IP address indicated in the ZOOM packet is behind the second edge device 106-2. Since the first edge device 106 included data corresponding to the destination IP address of the IP packet from which the ZOOM packet was translated, the destination IP address indicated in the ZOOM packet corresponds to the destination IP address of the IP packet. If the destination IP address indicated in the ZOOM packet corresponds to a destination behind the second edge device 106, the second edge device 106-2 re-creates the IP packet from the ZOOM packet (block 410) and sends the IP packet towards its destination. If the destination IP address does not correspond to a destination behind the second edge device 106, the second edge device 106 does not re-create the IP packet and the method can proceed to block 414.

The second edge device 106-2 can re-create the original IP packet by recreating the IP header and the ESP header (if present) from the information in the ZOOM header, the modified ESP header (if present) and the data field of the ZOOM packet. Also, information from a list of active data flows can be used to re-create the original IP packet. Just as each edge device 106 maintains a list of active data flows passing from endpoint device(s) 102 behind it into the broadcast network 110, each edge device 106 can also maintain a list of active data flows passing to endpoint device(s) 102 behind it from the broadcast network 110. The list can include an association between each data flow by SPI value and destination IP address and its source IP address. The list can be updated/populated with information from an initial packet in the data flow. As discussed above, for the initial packet in an ESP packet data flow, the edge devices 106 include the source IP address (or an index value indicative thereof), along with the SPI value and the destination IP address (or a corresponding index value) in the translated ZOOM packet. Thus, an edge device 106 receiving that ZOOM packet can store in its list of active data flows an association between the source IP address, and the combination of SPI value and the destination IP address. For subsequent ZOOM packets in that data flow, the sending edge device 106 will not include the source IP address, instead utilizing those bits for networking information, and the receiving edge device 106 can look-up the source IP address from its list of active data flows based on the SPI value and the destination IP address in the ZOOM packet.

With the source IP address obtained from the list of active data flows if necessary, the edge device 106 can re-create the original IP packet. To re-create the original IP packet, the edge device 106 re-creates the original IP header with the information from the ZOOM packet, the source IP address from the list of active data flows (if necessary). The edge device 106 also re-creates the ESP header (if it is an ESP packet) based on the modified ESP header in the ZOOM packet. The edge device 106 also copies the bits after the ZOOM header (or modified ESP header if present) as the remaining bits of the re-created IP packet. This will translate the ZOOM packet back into the original IP packet at that edge device 106. Once the original IP packet is re-created, the IP packet can be forwarded toward its destination(s) behind the second edge device 106-2 (block 412).

In an example, in addition to re-creating the original IP packet or in addition to determining that the original IP packet does not need to be re-created, the second edge device 106-2 can determine whether to forward the ZOOM packet (or a copy thereof) on to other devices in the broadcast network 110 in accordance with the protocol implemented by the broadcast network 110 (block 412). Since it is desirable for the networking information in the ZOOM packet to be received by all edge devices 106 in the broadcast network 110, and because the broadcast network 110 operates to broadcast packets to all devices therein, the second edge device 106-2 may forward to the ZOOM packet on to other devices in the broadcast network 110 in accordance with the protocol followed by the broadcast network 110 (block 416). If the ZOOM packet is not to be forward to other devices in the broadcast network 110 or used to re-create the original IP packet, the second edge device 106-2 can discard the ZOOM packet once the networking information is obtained therefrom (block 418).

With the plurality of edge devices 106 operating in this way to translate and re-create IP packets sent through the broadcast network 110, networking information can be exchanged among the edge devices 106 with small or no additional bits over that used to transmit the corresponding IP packets.

In some examples, networking information can be spread across several different packets in order to, for example, communicate networking information that is larger than the amount of space available via the bits in a single ZOOM packet.

In an example, the edge devices 106 can send networking information through the broadcast network 110 via the ZOOM method discussed above or via a standalone ZOOM packet. A standalone ZOOM packet is a ZOOM packet that is not a translation from an IP packet. That is, it is a ZOOM packet that is created independent of any IP packet. In a standalone ZOOM packet, there is more space for networking information because bits from an IP packet are not included.

Whether an edge device 106 sends the networking information via translating an IP packet or via a standalone IP packet can be based on whether sufficient outgoing IP packets are available to translate into ZOOM packets. As used herein an "outgoing IP packet" is a packet received at an edge device 106 from an endpoint device 102 for a destination across the broadcast network 110. For example, if it has been longer than a threshold length of time between outgoing IP packets or sets of packets, then the edge device 106 can generate and send a standalone ZOOM packet to communicate its information. In some examples, the threshold length of time can be measured from a point in time that the edge device 106 is ready to send networking information. For example, the edge devices 106 can be configured to send networking information (e.g., reachability information) periodically to keep the other edge devices 106 up-to-date. If no outgoing IP packets or sets of packets traverse through the edge device 106 within a threshold length of time after the point in time that corresponds to the period of sending networking information, the edge device 106 can create and send a standalone ZOOM packet. Other means of determining when to create and send a standalone ZOOM packet can also be used.

Figure 5A:
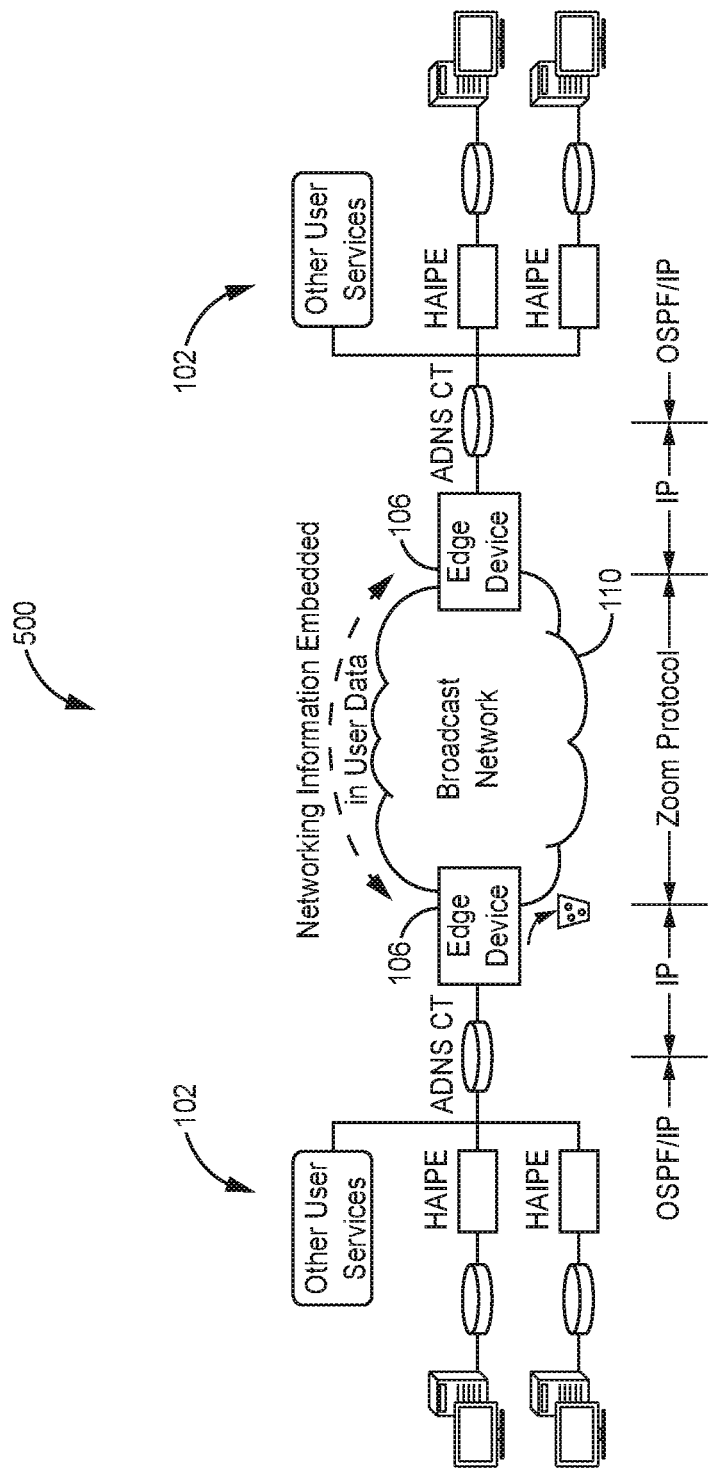
FIG. 5A is a block diagram of an example system including an edge device that controls entry of IP packets by discarding packets.

As mentioned above, based on the reachability information exchanged among the edge devices 106, the edge devices 106 can act to control entry of IP packets into the broadcast network 110. FIG. 5A is a block diagram of an example system 500 in which an edge device 106 can control entry of IP packets by maintaining a respective table of forward destinations and screening IP packets from endpoint devices 102 behind the edge device 106 to determine whether the packets are going to destinations that are reachable via the broadcast network 110. The configuration of edge device 106 described with respect to FIG. 5A is referred to herein as "bridge mode". The edge device 106 can screen a packet from an endpoint device 102 behind the edge device 106 by comparing the destination(s) in the IP header of the packet to the edge device's 106 table of forward destinations. If the IP packet does not have at least one destination on the table of forward destinations, then the edge device 106 discards the packet without translating the packet into a ZOOM packet because that packet's destination(s) are not reachable via the broadcast network 110. If the packet does have at least one destination on the table of forward destinations, the edge device 106 translates the IP packet into a ZOOM packet and sends the ZOOM packet into the broadcast network 110. In an example, routers communicating with the edge device 106 are setup such that their default route is to the edge device 106. Thus, IP packets received by those routers are sent to the edge device 106. In such an example, the edge device 106 discards routing protocol messages (e.g., OSPF) messages from those routers so that those messages are not translated into ZOOM packets and potentially flood the network with such messages.

Figure 5B:
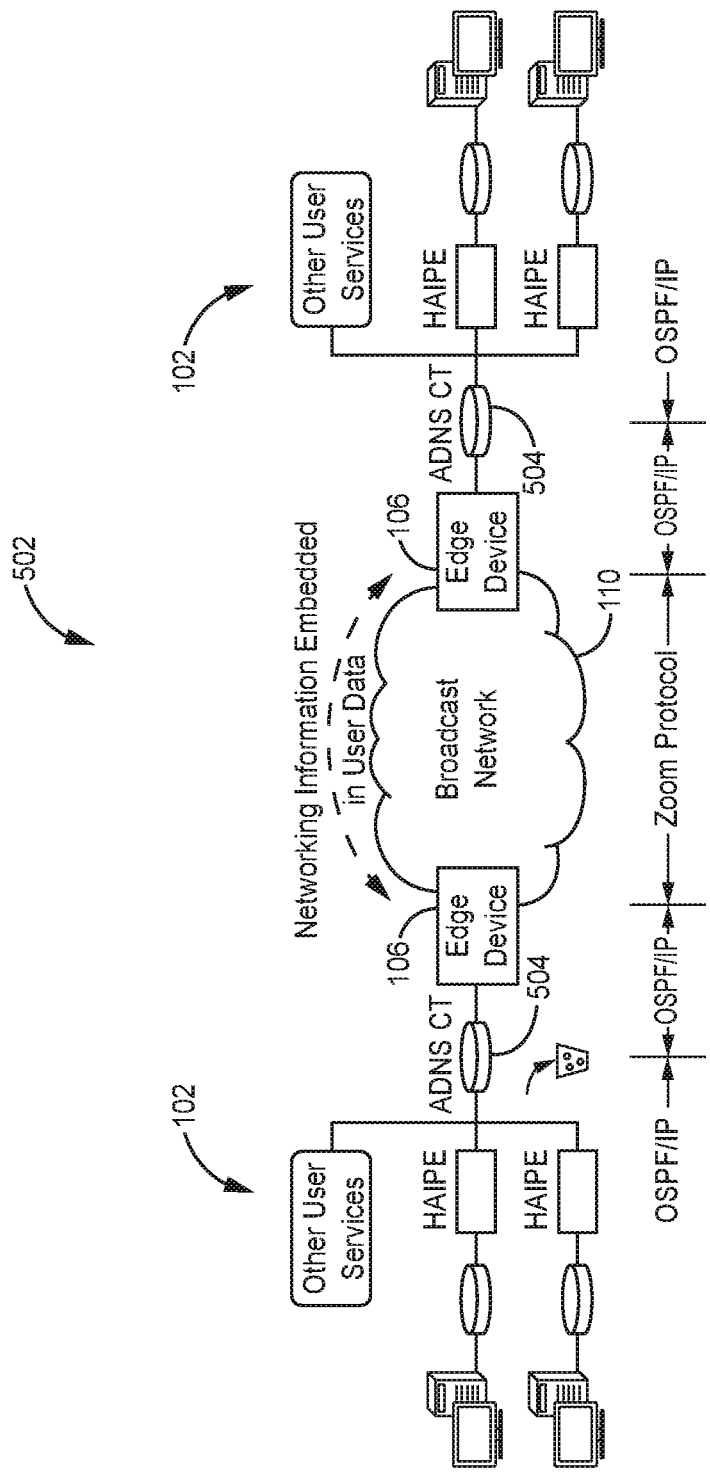
FIG. 5B is a block diagram of an example system including an edge device that controls entry of IP packets by communicating reachability information to a router therebehind.

In another example, an edge device 106 can control packets by sending reachability information to a router therebehind, wherein the router is executing a dynamic routing protocol. FIG. 5B is a block diagram of an example system 502 including such an edge device 106. The configuration of edge device 106 described with respect to FIG. 5B is referred to herein as "router mode". System 500 includes one or more endpoint devices 102 communicatively coupled behind the edge device 106, which is part of a broadcast network 110. System 500 also includes one or more routers 504 communicatively disposed between the endpoint device(s) 102 and the edge device 106. The one or more routers 504 are implementing a dynamic routing scheme to dynamically identify and update routes to destinations. In this example, the edge device 106 also includes some or all of the functionality of a router along with its functionality of an edge device 106 as discussed above. The router functionality is used by the edge device 106 to communicate with the one or more routers 504 using layer 3 messaging in accordance with the dynamic routing protocol used by the router(s) 504. In an example, the edge device 106 communicates with the router(s) 504 such that the edge device 106 appears to the router(s) 504 as another router and peers with that other router(s) 504. For example, if one of the other routers 504 is an Automated Digital Name System (ADNS) router, the edge device 106 can be configured to appear as an autonomous system border router to the ADNS router 504.

One such layer 3 messaging that the edge device 106 communicates is reachability information to the router(s) 504 indicating the destinations that are reachable over the broadcast network 110 via the edge device 106. By communicating the destinations that are reachable to the router(s) 504 disposed behind the edge device 106, those router(s) 504 in the process of performing their normal dynamic routing functions will only forward packets to the edge device 106 if those packets have a destination that is reachable via the edge device 106. Because the edge device 106 is providing to the router(s) 504, the reachability information it receives from other edge devices 106 in the broadcast network 110, the router(s) 504 will naturally filter packets so that packets for destinations that are not reachable via the broadcast network 110 are not sent to the edge device 106. In this way, the reachability information that is shared among the edge devices 106 can also be shared with routers 504 communicatively coupled to the edge devices 106 so that the edge devices 106 and routers 504 can work together to control which packets are sent into the broadcast network 110. Moreover, with the edge devices 106 configured to communicate with the routers 504 according to the dynamic routing protocol in use by the routers 504, the routers 504 will perform their portion of the packet control in the normal course without any special modification. In an example, the router(s) 504 operate using an open shortest path first (OSPF) dynamic routing protocol and the edge devices 106 communicate reachability and other information to the router(s) 504 in accordance with the OSPF protocol, e.g., using metric type 5 link-state advertisements.

In an example, each edge device 106 in the broadcast network 110 of FIG. 1 can be individually set to operate in "bridge mode" to discard packets locally based on its own table of forward destinations as discussed above, or can be set to operate in "router mode" where the edge device 106 sends reachability information to routers communicatively coupled therebehind. In an example, a given edge device 106 can operate in bridge mode for ports that are coupled to an endpoint device 102 without a router implementing a dynamic routing protocol therebetween and can operate in router mode for ports that are coupled to a router implementing a dynamic routing protocol. Thus, the edge device 106 can operate differently for different ports thereof. In an implementation of such an example, the edge device 106 can automatically discover routers and determine whether those routers are implementing a dynamic routing protocol and automatically set a given port to router mode if that port is communicatively coupled to a router implementing a dynamic routing protocol.

With all the edge devices 106 sharing reachability information and screening IP packets in this way, both the superfluous user data as well as the bandwidth for networking information in the broadcast network 110 are reduced or eliminated. Reduction of either of these results in more bandwidth in the broadcast network 110 for legitimate user data, which can be especially valuable in a low-bit rate network.

In an example, the edge devices 106 each have a respective list of backward destinations, which is a list of the destinations that are reachable behind that edge device 106. For example, edge device 106-1 can have a list of backward destinations that indicates endpoint device 102-1 as a backward destination thereof. Edge device 106-2 can have a list of backward destinations that indicate endpoint device 102-2 as a backward destination thereof. In an example, the list of backward destinations can include both single hop and multi-hop destinations reachable behind that edge device 106. The edge devices 106 use their list of backward destinations for the reachability information they send to other edge device 106. For example, edge device 106-1 sends reachability information indicating that each destination in the list of backward destinations is reachable therefrom. The destination(s) in the list of backward destinations for an edge device 106 can be indicated in one IP packet with reachability information or can be spread across multiple IP packets.

In an example, the list of backward destinations for an edge device 106 is manually set by a network administrator. That is, the destinations that the edge device 106 advertises in its reachability information are manually set by a network administrator. Manually setting these destinations can simplify the operation of the edge device 106 and may be suitable for situations in which the destinations or subnets behind an edge device 106 are generally static. Even in such situations where the list of backward destinations behind an edge device 106 is manually set, that edge device 106 will still dynamically update its table of forward destinations. Thus, although the destinations behind the edge device 106 are statically (manually) set, the destinations in front of the edge device 106 (i.e., destinations reachable via the broadcast network 110) are dynamically updated. In other examples, the list of backward destinations that are reachable behind the edge device 106 can also be dynamically updated. In such an example, changes to the list can be identified by the edge device 106 through messaging (e.g., layer 3) with networking devices (e.g., routers) behind that edge device 106, through tracking source addresses of packets, through a discovery mechanism, or via other means. In an example, the list of backward destinations is manually set when the edge device 106 is in "bridge mode" and is dynamically identified and updated when the edge device 106 is in "router mode". In an example, the list of backward destinations can be dynamically identified and updated by processing link-state advertisements (LSAs) from ADNS routers communicatively coupled behind the edge device 106. The destinations in the list of backward destinations are communicated via the reachability information over the broadcast network 110 to the other edge devices 106 as discussed above.

In an example, the edge devices 106 continually (e.g., periodically) re-communicate reachability information indicating the reachability of their backward destinations. For an edge device 106 with a manually set list of backward destinations, the list of backward destinations is not dynamically updated by the edge device 106. Nevertheless, there is still value in continually re-communicating reachability information to the other edge devices 106. For example, the re-communicated reachability information can be used by new edge devices 106 that join the broadcast network 110 after the previous reachability information was communicated. Also, the re-communicated reachability information can be used by other edge devices 106 to verify that a destination in its table of forward destinations is still reachable. For example, each edge device 106 can be configured to update their table of forward destinations to reflect previously reachable forward destinations that are no longer reachable. A previously reachable destination may no longer be reachable, for example, if the edge device 106 in front of that destination loses communication with the broadcast network 110. The edge devices 106 can be configured to identify such no longer reachable destinations and remove those destinations from their table of forward destinations or otherwise indicate in their table that the destination is not reachable.

In an example, the edge devices 106 can identify destinations in their tables that are no longer reachable based on a lack of continually receiving reachability information indicating that the destination is reachable. In an implementation of such an example, each edge device 106 can be configured to periodically send reachability information indicating the reachability of all destinations therebehind. In such an implementation, an edge device 106 can be configured to remove a destination from its table of destinations if no information for that destination is received within a threshold period of time (e.g., three reporting periods). Thus, when an edge device 106 leaves the broadcast network 110 its reachability information will no longer be received by the other edge devices 106. If the destination(s) in its reachability information are not reachable via another edge device 106, then upon not receiving reachability information indicating the reachability of the destinations of that edge device within a threshold period of time, the other edge devices 106 will remove those destination(s) from their tables of reachable destinations. In other implementations, the edge devices 106 can track which edge device 106 corresponds to each destination in their table of forward destinations and the edge devices 106 can, instead of sending all their reachability information through the broadcast network 110, periodically send a hello message indicating that they are still present. In response to receiving the information that that edge device 106 is still present, the other edge devices 106 can keep the destinations corresponding to that edge device 106 indicated as being reachable in their tables. Conversely, if a hello message from an edge device 106 is not received for a threshold length of time, the other edge devices 106 can remove the corresponding destinations or otherwise indicate them as not reachable in their tables.

In an example and as discussed above, some or all of the possible subnets that may be a destination in the system 100 are known a priori and the edge devices 106 are pre-configured with a set of index numbers, each of which are assigned to a respective subnet in the system 100. For example, a first subnet can be assigned the index number '0001', a second subnet can be assigned the index number '0002', etc. With the edge devices 106 pre-configured with the correspondence between index numbers and subnets, the edge devices 106 can send the corresponding index numbers in their networking information (e.g., reachability information) to indicate a given subnet in system 100. Sending index numbers instead of the subnet address can reduce the number of bits needed to communicate the information.

Figure 6:
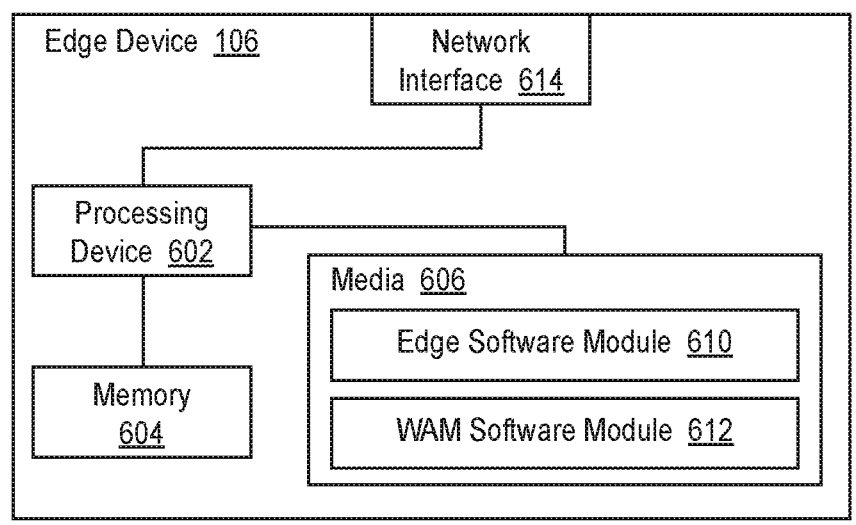
FIG. 6 is a block diagram of an example edge device.

FIG. 6 is a block diagram of an example edge device 106. Each edge device 106 can include an edge software module 610 which is software including instructions to implement the functionality of an edge device 106 or a portion of the functionality of an edge device 106 described herein. The edge software module 610 can include instructions which, when executed by one or more processing devices 602 of the edge device 106, perform functionality of an edge device 106 described herein. The edge device 106 can also include other software modules to implement other functionality such as a WAM module 612 to implement the functionality of a WAM. In an example, the edge module 610 can interact with one or more application programming interfaces (APIs) of the WAM module 612 to obtain information and control aspects of the WAM module 612, such as information/control relating to the link state information or control channel of the WAM. The edge module 610 can be a software module that is loaded onto a hardware device at the factory during manufacture or can be an add-on software module that is loaded onto a commercial off-the-shelf (COTS) device (e.g., WAM) in the field.

The one or more processing devices 602 can execute the instructions of the edge software module 610 and the WAM module 612. The one or more processing devices 602 can include a general-purpose processor or a special purpose processor. The instructions of the edge module 610 are stored (or otherwise embodied) on or in an appropriate storage medium or media 606 (such as a flash or other non-volatile memory) from which the instructions are readable by the processing device(s) 602 for execution thereby. The edge device 106 also includes memory 604 that is coupled to the processing device(s) 602 for storing instructions (and related data) during execution by the processing device(s) 602. Memory 604 comprises, in one implementation, any suitable form or random-access memory (RAM) now known or later developed, such as dynamic random-access memory (DRAM). In other implementations, other types of memory are used. The instructions of the edge module 610, when executed by the one or more processing devices 602, cause the one or more processing devices 602 to perform the actions (or a portion thereof) of an edge device 106 described herein.

The edge device 106 also includes one or more network interfaces 614 for communicating with devices behind and/or in front of the edge device 106. The one or more network interfaces 614 can be coupled to the one or more processing devices 602. The one or more network interfaces can include wired and/or wireless interfaces such as an Ethernet interface, a satellite transceiver, an IEEE 802.11 transceiver, a cellular transceiver, or other interface.

Figure 7:
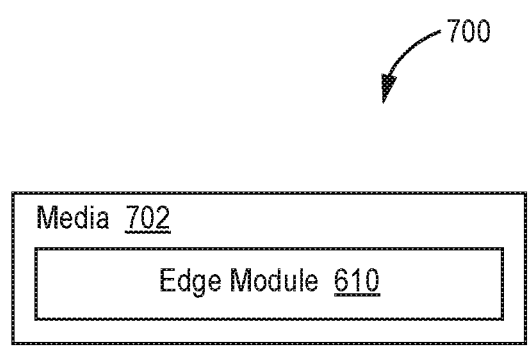
FIG. 7 is a block diagram of an example program product including an edge software module for an edge device.

FIG. 7 is a block diagram of an example software product edge module 700. The software product 700 includes a computer readable medium 702 including an edge software module 610 that can be loaded onto an appropriate hardware device. The edge module 610 includes instructions that are stored or other embodied on the computer readable medium 702 that is distinct from any processing device(s), memory, or other associated hardware for executing those instructions. The edge module 610 instructions can be loaded onto an appropriate hardware device, such as the edge device 106 shown in FIG. 6, for the hardware device to execute the instructions and perform the functionality (or a portion thereof) of an edge device 106 described herein. The computer readable medium 702 on which the edge module 610 is stored can be any suitable computer readable media, such as a magnetic media such as a hard disk drive (HDD), optical media such as a CD, DVD, Blu-Ray disk, or a non-volatile electric media such as a solid-state drive (SDD), flash media, or EEPROM. Such computer readable media can be stand-alone media (e.g., a USB stick or CD) or can be computer readable media within a computing device (e.g., a server or network accessible storage).

Figure 8:
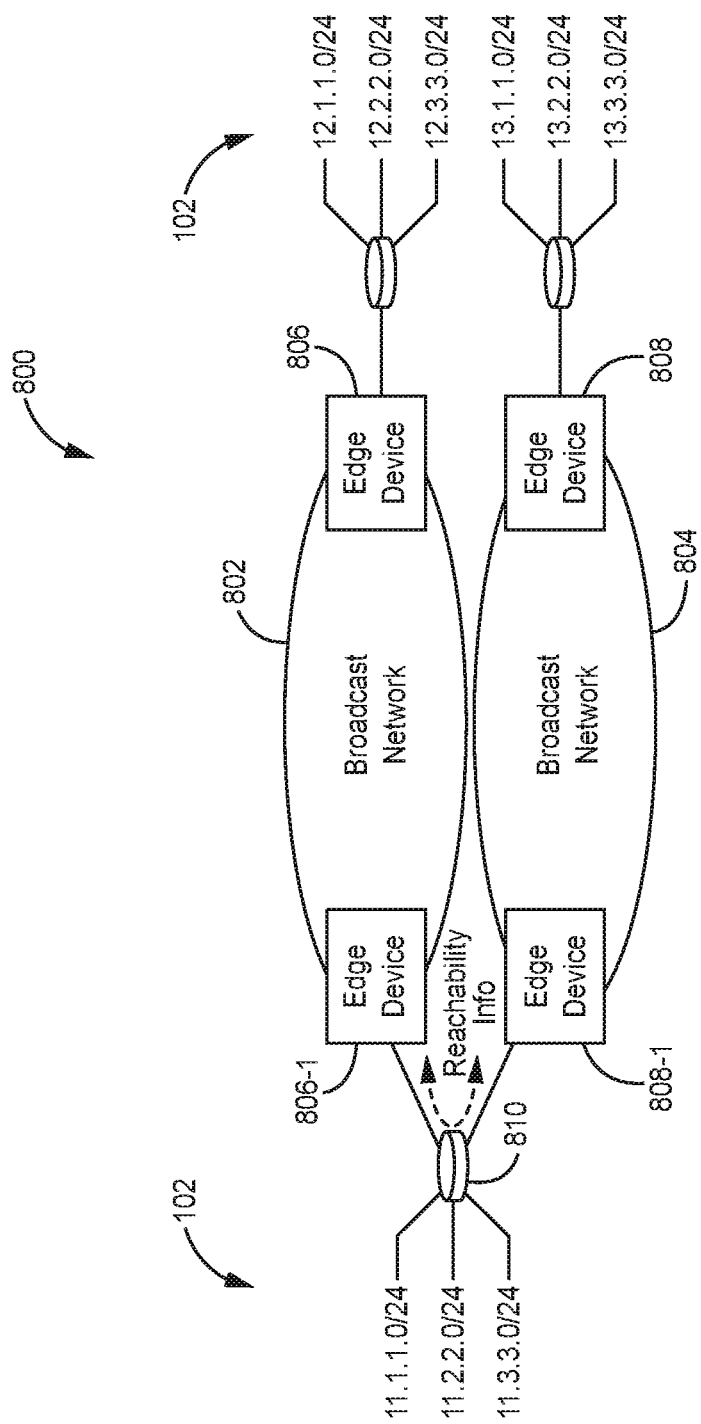
FIG. 8 is a block diagram of an example system including two edge devices communicatively coupling different broadcast networks together.

FIG. 8 is a block diagram of another example system 800 in which a plurality of edge devices 106 can be used. System 800 includes a first broadcast network 802 and a second broadcast network 804. The first broadcast network 802 includes a first plurality of edge devices 806. The second broadcast network 804 includes a second plurality of edge devices 808. In this example, the first broadcast network 802 is communicatively coupled to the second broadcast network 804 via respective edge devices 806-1, 808-1 and another networking device 810. The first edge device 806-1 is part of the first broadcast network 802 and the second edge device 808-1 is part of the second broadcast network 804. The first edge device 806-1 is communicatively coupled to the second edge device 808-1 via a networking device (e.g., router) 810. In other examples, the first edge device 806-1 can be directly coupled to the second edge device 808-1 or there can be more than one networking device communicatively coupled between the first edge device 806-1 and the second edge device 808-1.

The first plurality of edge devices 806 can exchange networking information as discussed above to maintain respective tables of forward destinations for the first broadcast network 802. The second plurality of edge devices 808 can also exchange networking information to maintain respective tables of forward destinations for the second broadcast network 804. Additionally, the first and second edge devices 806-1, 808-1 can exchange networking information, including reachability information, to learn of the destinations reachable via the other broadcast network 802, 804.

The first edge device 806-1 can communicate reachability information to the second edge device 808-1, the reachability information indicating which forward destinations are reachable from the first edge device 806-1. The forward destinations communicated can be the forward destinations indicated as reachable in the table of forward destinations maintained by the first edge device 806-1. If the first edge device 806-1 continually (e.g., periodically) communicates its forward reachable destinations from its up-to-date table of forward destinations, the second edge device 808-1 can stay up-to-date on which destinations are reachable via the first edge device 806-1.

The second edge device 808-1 can likewise communicate reachability information to the first edge device 806-1, the reachability information indicating which forward destinations are reachable from the second edge device 808-1. The forward destinations communicated can be the forward destinations indicated as reachable in the table of forward destinations maintained by the second edge device 808-1. If the second edge device 808-1 continually (e.g., periodically) communicates its forward reachable destinations from its up-to-date table of forward destinations, the first edge device 806-1 can stay up-to-date on which destinations are reachable via the second edge device 808-1.

In response to receiving reachability information from the first edge device 806-1, the second edge device 808-1 can add the destinations indicated as reachable from the first edge device 806-1 to its list of backward destinations. The first edge device 806-1 can likewise add the destinations indicated as reachable from the second edge device 808-1 to its list of backward destinations. Based on continual reception of this reachability information, the first and second edge devices 806-1, 808-1 can maintain their lists of backward destinations to reflect the up-to-date reachability of the destinations in the other broadcast network 802, 804.

With the list of backward destinations in the first and second edge devices 806-1, 808-1 including not only the endpoint devices 102 and/or subnets communicatively coupled behind those devices 806-1, 808-1, but also including the destinations reachable via the other broadcast network 802, 804, the first and second edge devices 806-1, 808-1 will include the destinations reachable via the other broadcast network 802, 804 in their reachability information sent in their own broadcast network 802, 804. That is, the first edge device 806-1 will advertise reachability of destinations in the second broadcast network 804 to other edge devices 806 in the first broadcast network 802. Likewise, the second edge device 808-1 will advertise reachability of destinations in the first broadcast network 802 to other edge devices 808 in the second broadcast network 804. In this way, the first and second plurality of edge devices 806, 808 can all learn of the reachability of all destinations via both the first broadcast network 802 and the second broadcast network 804. Accordingly, the communicative coupling and networking information exchanged between the first and second edge devices 806-1, 808-1 forms one routable network out of the two broadcast networks 802, 804.

Additionally, via the reachability information exchanged between the first and second edge devices 806-1, 808-1 and the reachability information exchanged amongst the first plurality of edge devices 806 and second plurality of edge devices 808, the first and second plurality of edge devices 806, 808 can all stay up-to-date on new destinations that are reachable and previously reachable destinations that are no longer reachable in both broadcast networks 802, 804.

In an example, the first and second edge devices 806-1, 808-1 are manually configured to send the reachability information (and other networking information) therebetween. That is, a network operator manually sets the first edge device 806-1 to communicate with the second edge device 808-1 and vice versa. In other examples, the first and second edge devices 806-1, 808-1 can automatically discover each other (when they are in router mode for example) using layer 3 messages.

The networking information sent between the first and second edge devices 806-1, 808-1 can be in standalone ZOOM packets and can have any suitable format, including a format complying to a dynamic routing protocol, such as OSPF. In an example, the reachability information and other networking information exchanged between first and second edge devices 806-1, 808-1 is exchanged via the intermediary networking device (e.g., router) 810. The first and second edge devices 806-1, 808-1 can send the reachability information to the intermediary networking device 810 in accordance with a dynamic routing protocol (e.g., OSPF) in which the intermediary networking device 810 operates. Further in accordance with the dynamic routing protocol, the intermediary networking device 810 can sends its own reachability information which includes the reachability of destinations it received from the first and second edge devices 806-1, 808-1. The first and second edge devices 806-1, 808-1 will then receive this reachability information from the intermediary networking device 810 and learn of the reachability of the destinations in the other broadcast network 802, 804.

Although two broadcast networks 802, 804 and two corresponding edge devices 806-1, 808-1 are shown in the example of FIG. 8, more than two broadcast networks 802, 804 can be communicatively coupled together in this way via networking information exchange between corresponding edge devices.

Figure 9A:
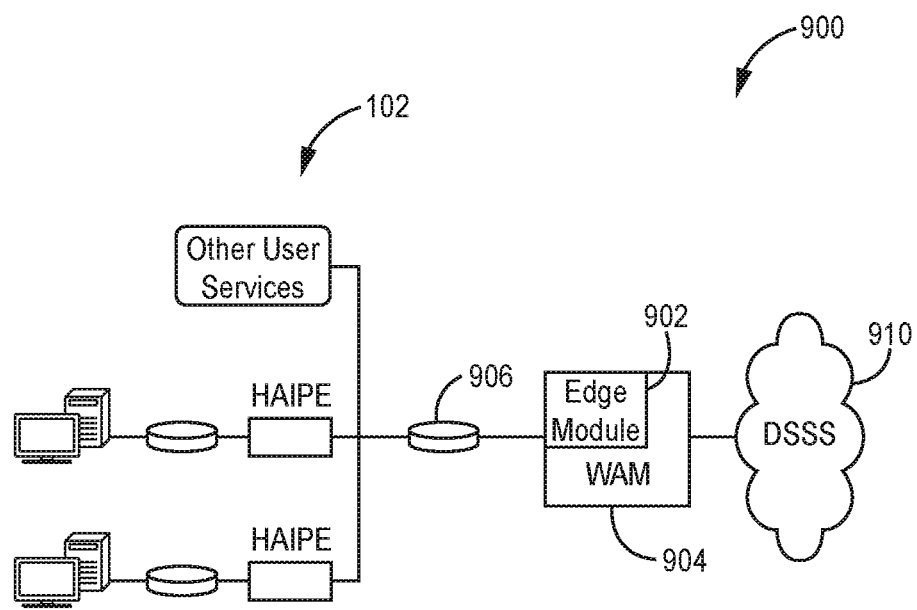
FIG. 9A is a block diagram of an example system in which an edge device is a commercial off-the-shelf (COTS) device having an edge software module loaded thereon.

FIG. 9A is a block diagram of an example system 900 including an edge device in which an edge software module 902 is embedded into a commercial off-the-shelf (COTS) device, causing the COTS device to perform the functionality of an edge device 106 described herein. In this example, the COTS device is a wideband anti-jam modem (WAM) 904 which is configured to perform the functions of an edge device 106 along with the functions of the WAM. In this example, the broadcast network 110 is a satellite communications network 910 and the WAM operates in accordance with a WAM direct sequence spread spectrum (DSSS) mode specification (e.g., version 0.8 or version 2.0) promulgated by the United States Navy. The WAM 904 has the edge software module 902 loaded thereon which, when executed by processing device(s) of the WAM 904, causes the WAM 904 to perform the functions of an edge device 106 described herein. The WAM 904 can also perform the regular functions of a WAM, which includes communicating in accordance with the DSSS specification of the broadcast network 910. The system 900 can also include a router (e.g., ADNS router) 906 and a plurality of endpoint devices 102 communicatively disposed behind the WAM 904.

Figure 9B:
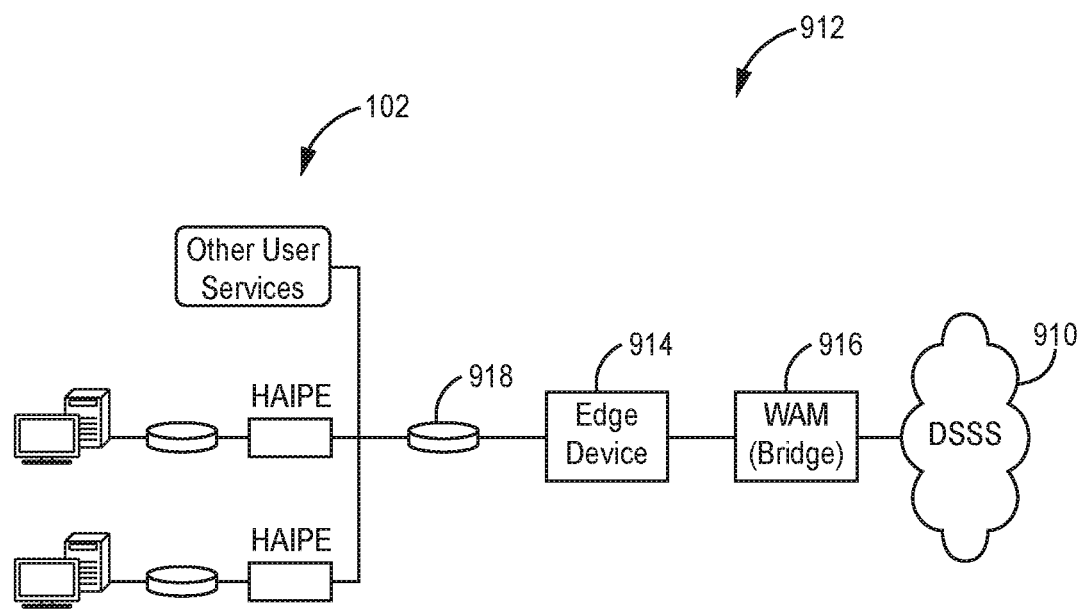
FIG. 9B is a block diagram of an example system in which an edge device is a stand-alone hardware appliance.

FIG. 9B is a block diagram of an example system 912 including an edge device that is a stand-alone hardware appliance 914. The stand-alone hardware appliance 914 can include an edge software module causing the stand-alone appliance 914 to perform the functions of an edge device 106 described herein. The system 912 can also include a WAM 916 disposed in front of the stand-alone appliance 914 for sending and receiving signals in a DSSS broadcast network 910. The hardware appliance 914 can include a network interface (e.g., Ethernet interface) to send and receive packets with the WAM 916. The hardware appliance 514 can also include one or more other network interfaces (e.g., Ethernet and/or Wi-Fi interfaces) for sending and receiving packets with endpoint devices 102 and/or subnet(s) behind the appliance 914. The system 912 can also include a router (e.g., ADNS router) 918 and a plurality of endpoint devices 102 communicatively disposed behind the stand-alone appliance 914.

What is claimed is:

1. A method of exchanging networking information, the method comprising:
receiving an internet protocol (IP) packet at a first networking device;
translating, at the first networking device, the IP packet into a ZOOM packet, wherein the ZOOM packet does not conform to an IP protocol, wherein the ZOOM packet includes a copy of the bits of the data field from the IP packet, wherein the ZOOM packet includes a ZOOM header with a portion of an IP header of the first IP packet with networking information, wherein the ZOOM packet has less than or equal to the number of bits of the IP packet;
sending the ZOOM packet into a broadcast network;
receiving the ZOOM packet at a second networking device;
extracting the networking information from the ZOOM header;
re-creating the IP packet; and
sending the re-created IP packet toward a destination of the IP packet.

2. The method of claim 1, wherein the networking information includes reachability information advertising reachability of destinations via the first networking device, the method comprising:
maintaining, at the second networking device, a table of forward destinations that are reachable based on the reachability information; and controlling, at the second networking device, entry of IP packets into the broadcast network based on the table of forward destinations.

3. The method of claim 1, wherein the re-created IP packet is identical to the IP packet.

4. The method of claim 1, wherein re-creating the IP packet includes:
obtaining a source IP address for the IP packet by looking-up an association between the combination of a security parameter index (SPI) value and a destination IP address indicated in the ZOOM packet and a source IP address.

5. The method of claim 4, comprising:
receiving, at the second networking device, a second ZOOM packet prior to receiving the ZOOM packet, the second ZOOM packet being part of a common conversation with the ZOOM packet; and
storing an association between a source IP address indicated in the second ZOOM packet and a combination of an SPI value and a destination IP address indicated in the second ZOOM packet.

6. The method of claim 1, wherein the IP packet conforms to the IP version 4 (IPv4) protocol.

7. The method of claim 1, wherein the first and second networking devices are respective wideband anti jam modems (WAMs).

8. The method of claim 1, wherein the networking information includes control plane payload for the second networking device.

9. The method of claim 8, wherein the control plane payload includes at least one of reachability information, link monitoring information, link management information, or a data compression technique.

10. The method of claim 8, wherein the broadcast network is a satellite communications network.

11. The method of claim 10, wherein the broadcast network operates in accordance with a wideband anti jam modem direct sequence spread spectrum (DSSS) mode specification promulgated by the United States Navy.

12. A program product comprising:
a non-transitory processor readable medium having software stored thereon, the software, when executed by one or more processing devices of a first networking device, configured to:
receive an internet protocol (IP) packet;
translate the IP packet into a ZOOM packet, wherein the ZOOM packet does not conform to an IP protocol, wherein the ZOOM packet includes a copy of the bits of the data field from the IP packet, wherein the ZOOM packet includes a ZOOM header with a portion of an IP header of the first IP packet with first networking information, wherein the ZOOM packet has less than or equal to the number of bits of the IP packet;
send the ZOOM packet into a broadcast network;
receive a second ZOOM packet via the broadcast network, wherein the second ZOOM packet was sent into the broadcast network by a second networking device, wherein the second ZOOM packet does not conform to an IP protocol, wherein the second ZOOM packet includes a copy of the bits of the data field from a second IP packet, wherein the second ZOOM packet includes a ZOOM header with a portion of an IP header of the second IP packet with second networking information, wherein the ZOOM packet has less than or equal to the number of bits of the second IP packet;

extract the second networking information from the ZOOM header of the second ZOOM packet;
re-create the second IP packet corresponding to the second ZOOM packet; and
send the re-created second IP packet toward a destination of the second IP packet.

13. The program product of claim 12, wherein the second networking information includes reachability information advertising reachability of destinations via the second networking device, the software further configured to:
maintain a table of forward destinations that are reachable based on the reachability information; and
control entry of IP packets into the broadcast network based on the table of forward destinations.

14. The program product of claim 12, wherein the re-created second IP packet is identical to the second IP packet.

15. The program product of claim 12, wherein re-create the second IP packet includes:
obtain a source IP address for the second IP packet by looking-up an association between the combination of a security parameter index (SPI) value and a destination IP address indicated in the second ZOOM packet and a source IP address.

16. The program product of claim 15, wherein the instructions are configured to:
receive a third ZOOM packet prior to receiving the second ZOOM packet, the third ZOOM packet being part of a common conversation with the second ZOOM packet; and
storing an association between a source IP address indicated in the third ZOOM packet and a combination of an SPI value and a destination IP address indicated in the third ZOOM packet.

17. The program product of claim 12, wherein the IP packet conforms to the IP version 4 (IPv4) protocol.

18. The program product of claim 12, wherein the first and second networking devices are respective wideband anti jam modems (WAMs).

19. The program product of claim 12, wherein the first networking information includes first control plane payload from the first networking device for the second networking device, wherein the second networking information includes second control plane payload from the second networking device for the first networking device.

20. The program product of claim 19, wherein the first control plane payload and the second control plane payload include at least one of reachability information, link monitoring information, link management information, or a data compression technique.

21. The program product of claim 19, wherein the broadcast network is a satellite communications network.

22. The program product of claim 21, wherein the broadcast network operates in accordance with a wideband anti jam modem direct sequence spread spectrum (DSSS) mode specification promulgated by the United States Navy.

23. A networking device comprising:
one or more processing devices;
storage media communicatively coupled to the one or more processing devices, the storage media including software stored thereon, the software, when executed by the one or more processing devices, configured to:
receive an internet protocol (IP) packet;
translate the IP packet into a ZOOM packet, wherein the ZOOM packet does not conform to an IP protocol, wherein the ZOOM packet includes a copy of the bits of the data field from the IP packet, wherein the ZOOM packet includes a ZOOM header with a portion of an IP header of the first IP packet with first networking information, wherein the ZOOM packet has less than or equal to the number of bits of the IP packet;

send the ZOOM packet into a broadcast network;

receive a second ZOOM packet via the broadcast network, wherein the second ZOOM packet was sent into the broadcast network by a second networking device, wherein the second ZOOM packet does not conform to an IP protocol, wherein the second ZOOM packet includes a copy of the bits of the data field from a second IP packet, wherein the second ZOOM packet includes a ZOOM header with a portion of an IP header of the second IP packet with second networking information, wherein the ZOOM packet has less than or equal to the number of bits of the second IP packet;

extract the second networking information from the ZOOM header of the second ZOOM packet;

re-create the second IP packet corresponding to the second ZOOM packet; and send the re-created second IP packet toward a destination of the second IP packet.

24. The networking device of claim 23, wherein the second networking information includes reachability information advertising reachability of destinations via the second networking device, the software further configured to:

maintain a table of forward destinations that are reachable based on the reachability information; and control entry of IP packets into the broadcast network based on the table of forward destinations.

25. The networking device of claim 23, wherein the re-created second IP packet is identical to the second IP packet.

26. The networking device of claim 23, wherein re-create the second IP packet includes:

obtain a source IP address for the second IP packet by looking-up an association between the combination of a security parameter index (SPI) value and a destination IP address indicated in the second ZOOM packet and a source IP address.

27. The networking device of claim 26, wherein the instructions are configured to:

receive a third ZOOM packet prior to receiving the second ZOOM packet, the third ZOOM packet being part of a common conversation with the second ZOOM packet; and storing an association between a source IP address indicated in the third ZOOM packet and a combination of an SPI value and a destination IP address indicated in the third ZOOM packet.

28. The networking device of claim 23, wherein the networking device and the second networking devices are respective wideband anti jam modems (WAMs).

29. The networking device of claim 23, wherein the first networking information is control plane payload from the networking device for the second networking device, wherein the second networking information is control plane payload from the second networking device for the networking device.

30. The networking device of claim 29, wherein the first control plane payload and the second control plane payload include at least one of reachability information, link monitoring information, link management information, or a data compression technique.

31. The networking device of claim 29, wherein the broadcast network is a satellite communications network.

32. The networking device of claim 31, wherein the broadcast network operates in accordance with a wideband anti jam modem direct sequence spread spectrum (DSSS) mode specification promulgated by the United States Navy.

* * * * *